(12) United States Patent
Zipperer et al.

(10) Patent No.: US 8,745,749 B2
(45) Date of Patent: Jun. 3, 2014

(54) VIRTUAL SECURE DIGITAL CARD

(75) Inventors: Joseph P. Zipperer, Seattle, WA (US); John Calixto, Seattle, WA (US)

(73) Assignee: Media IP, LLC, Seattle, WA (US)

( * ) Notice: Subject to any disclaimer, the term of this patent is extended or adjusted under 35 U.S.C. 154(b) by 458 days.

(21) Appl. No.: 13/078,323

(22) Filed: Apr. 1, 2011

(65) Prior Publication Data

US 2012/0124390 A1   May 17, 2012

Related U.S. Application Data

(60) Provisional application No. 61/413,926, filed on Nov. 15, 2010.

(51) Int. Cl.
*G06F 17/30* (2006.01)
(52) U.S. Cl.
USPC ............ 726/26; 713/165; 713/172; 713/176; 713/189; 711/115; 705/51; 705/67
(58) Field of Classification Search
CPC ... G06F 3/0668; G06F 3/0673; G06F 3/0679; G06F 3/0629; G06F 3/0632; G06Q 20/367
USPC .................. 713/165, 172, 176, 189; 726/26; 711/115; 705/51, 67
See application file for complete search history.

(56) References Cited

U.S. PATENT DOCUMENTS

| | | |
|---|---|---|
| 6,697,944 B1 | 2/2004 | Jones et al. |
| 6,859,791 B1 | 2/2005 | Spagna et al. |
| 7,360,088 B2 | 4/2008 | Mishina et al. |
| 7,505,584 B2 | 3/2009 | Kamibayashi et al. |
| 7,779,064 B2 | 8/2010 | Phillips |
| 7,809,888 B1 | 10/2010 | Clark et al. |
| 7,844,831 B2 | 11/2010 | Benhammou et al. |
| RE42,019 E * | 12/2010 | Tagawa et al. .................. 726/27 |
| 8,306,918 B2 | 11/2012 | Farrugia |
| 8,312,294 B2 | 11/2012 | Sato et al. |

(Continued)

OTHER PUBLICATIONS

Android Developers Guide, Android Software Developers Kit (SDK), Android Version 1.5 r3, Nov. 13, 2009, pp. 1-24. Available online at >netmite.com/android/mydroid/1.6/out/target/common/docs/offline-sdk/offline.html<.*

(Continued)

*Primary Examiner* — Eleni Shiferaw
*Assistant Examiner* — Paul Callahan
(74) *Attorney, Agent, or Firm* — Lowe Graham Jones PLLC

(57) ABSTRACT

A system (and a method) are disclosed for generating a virtual secure digital (SD) card. One embodiment detects an SD card and reads a media key block and media identification for the SD card. The system stores the media key block and the media identification. The system creates a file system for secure data on a storage device for storage of secure data corresponding to a secure data area of the SD card and creates a file system for user data on the storage device for storage of user data corresponding to a user data area of the SD card. In addition, the system uses the virtual secure digital (SD) card. The system determines if the virtual SD card is provisioned and provisions it if not. The system accesses the data stored in the secure area of the provisioned virtual SD card. The system extracts the data from the secured area of the provisioned virtual SD card.

25 Claims, 5 Drawing Sheets

(56) References Cited

U.S. PATENT DOCUMENTS

| | | |
|---|---|---|
| 2002/0126841 A1 | 9/2002 | Arai |
| 2003/0220835 A1 | 11/2003 | Barnes, Jr. |
| 2004/0006690 A1 | 1/2004 | Du |
| 2004/0010601 A1 | 1/2004 | Afergan et al. |
| 2004/0254940 A1 | 12/2004 | Brush |
| 2005/0025465 A1 | 2/2005 | Danieli |
| 2005/0044280 A1 | 2/2005 | Reisman |
| 2005/0190782 A1 | 9/2005 | Buckley et al. |
| 2006/0156355 A1 | 7/2006 | Kawasaki et al. |
| 2006/0200415 A1 | 9/2006 | Lu |
| 2006/0224519 A1 | 10/2006 | Ahn |
| 2007/0033344 A1* | 2/2007 | Tanaka .......................... 711/115 |
| 2007/0192634 A1 | 8/2007 | Cheon |
| 2007/0219921 A1 | 9/2007 | Lee et al. |
| 2007/0234341 A1* | 10/2007 | Chang et al. .................. 717/173 |
| 2008/0075437 A1 | 3/2008 | Hamada et al. |
| 2008/0098239 A1 | 4/2008 | Wada et al. |
| 2008/0133546 A1 | 6/2008 | Phillips |
| 2008/0176540 A1 | 7/2008 | Khedouri et al. |
| 2008/0205291 A1 | 8/2008 | Li et al. |
| 2008/0228300 A1 | 9/2008 | Tagawa et al. |
| 2008/0270796 A1 | 10/2008 | Suu et al. |
| 2008/0271154 A1 | 10/2008 | Kamada et al. |
| 2009/0150487 A1 | 6/2009 | Wolfish et al. |
| 2009/0164709 A1 | 6/2009 | Lee et al. |
| 2009/0282454 A1 | 11/2009 | Ekstrand |
| 2009/0313432 A1 | 12/2009 | Spence et al. |
| 2010/0127013 A1 | 5/2010 | Butler |
| 2010/0262912 A1 | 10/2010 | Cha |
| 2010/0280953 A1 | 11/2010 | Kitazato |
| 2010/0287609 A1 | 11/2010 | Gonzalez et al. |
| 2010/0293581 A1 | 11/2010 | Robert |
| 2010/0297933 A1* | 11/2010 | Sim .............................. 455/3.05 |
| 2011/0009051 A1 | 1/2011 | Khedouri et al. |
| 2011/0078722 A1 | 3/2011 | Wendling |
| 2011/0091187 A1 | 4/2011 | Duffin et al. |
| 2011/0093622 A1 | 4/2011 | Hahn et al. |
| 2011/0197131 A1 | 8/2011 | Duffin et al. |
| 2011/0225417 A1 | 9/2011 | Maharajh et al. |
| 2011/0289137 A1 | 11/2011 | Ittah et al. |
| 2012/0072713 A1 | 3/2012 | Begum et al. |
| 2012/0137135 A1* | 5/2012 | Kasahara et al. ............. 713/176 |
| 2012/0233447 A1 | 9/2012 | Fitzgerald |
| 2012/0254629 A1 | 10/2012 | Zipperer et al. |
| 2012/0272065 A1* | 10/2012 | Matsukawa et al. .......... 713/171 |
| 2012/0315019 A1 | 12/2012 | Zipperer et al. |
| 2012/0324244 A1 | 12/2012 | Zipperer et al. |

OTHER PUBLICATIONS

Young; International Search Report for PCT/US07/22007; mailed May 5, 2008; 1 page.

Guofei, Gu; PLI: A New Framework to Protect Digital Content for P2P Networks; Year: 2003; Microsoft Research Asia, Beijing 100080, China; pp. 1-12.

* cited by examiner

VIRTUAL SECURE DIGITAL CARD

CROSS REFERENCE TO RELATED APPLICATIONS

This application claims the benefit of U.S. Provisional Application No. 61/413,926, filed Nov. 15, 2010, which is incorporated by reference in its entirety.

BACKGROUND

1. Field of Art

The disclosure generally relates to the field of memory devices, and more particularly, generation of virtual memory devices.

2. Description of the Related Art

Secure Digital (SD) cards are in wide use for many storage applications. They are most commonly used to store audio (MP3 players), pictures (digital cameras), and full motion video (camcorders and HD camcorders). The SD card provides an acceptable portable storage medium to transfer unprotected content between different devices, especially for the video capture devices mentioned above. The content stored on SD cards can be transferred or archived to devices with larger storage capacities and additional processing capabilities. One such additional processing capability allows consumers to create and manage a digital archive of consumer generated content.

Consumers are familiar with the SD card's basic storage capabilities, but they are mostly unaware of its security features (the S in Secure Digital). This is because there are very few applications that use this advanced functionality. Applications that use the security features primarily enable digital rights management (DRM) to protect commercial content from copying or other forms of piracy. Examples of DRM applications include still images (Gallery Player) and full-motion video (1-seg and GreenPlay). The DRM protection must remain intact during content loading, transfer, and archival. Maintaining protection through transfers from SD card to other memories cannot be archived easily. While an SD card is suited for content loading and transfer, it is not as well suited for the archival aspect.

SD cards are suited to content loading, purchasing and transporting content, but not for creating a digital library. The main reasons correspond to the primary use of SD cards as a portable storage medium. Accordingly, the size, cost, and the lack of labeling on the SD card result in an undesirable format for a digital library. Although SD cards are available currently in up to 64 gigabyte (GB) capacity, a typical digital rights management (DRM)-protected commercial video is approximately 2 GB. Therefore, only 32 DRM-protected commercial videos can be stored on any single SD card. Multiple SD cards are required in order to create a digital library of any significant capacity. In contrast, hard disk drives are in abundant supply in sizes ranging from several hundred gigabytes to few tens of terabytes. These allow for storing upwards of 5000 DRM-protected commercial videos at roughly the same price as a 32 GB SD card.

The DRM used by SD cards, content protection for recordable media (CPRM), allow for content to be moved and/or copied to other CPRM-compliant devices because the antipiracy mechanism is maintained, but technical challenges have prevented this. First, the CPRM license agreement specifies the process requirements for moving content to/from the SD card, but does not specify the file formats for the non-SD card device. In addition, file structures and data to implement the DRM are complex and have many entities. A typical secure exchange to move or copy content may require a minimum of 150 secure operations for the DRM portion alone. Maintaining the complex relationships within a new file structure presents a substantial processing and memory resource challenge in addition to the effort of developing software code to maintain and manage the process.

Second, security software is only defined for personal computer (PC) architectures. It is not defined for other software or hardware architectures, including many devices which utilize SD cards that must maintain DRM protection through the transfer and viewing processes such as mobile phones, TV, set top boxes, and Blu-ray disc players and the like.

Third, many devices may not implement an internal SD card for a variety of reasons including cost, space considerations for connectors, and the aforementioned lack of security software drivers. Alternatively, these devices include dedicated flash for storage applications, but lack the security feature included within the SD card. Thus, these devices are unsuitable for storage according to the DRM requirements.

Conventional external storage does not support securely storing data. A few proprietary solutions exist, but no standardized solution is available apart from SD cards because there has not been a consumer requirement for secure external storage.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system (or method and computer readable storage medium) that provisions a virtual secure digital (SD) card is described. In one example configuration the system detects an SD card and reads a media key block and media identification for the SD card. The system stores the media key block and the media identification. On the storage device, the system creates a file system for secure data storage corresponding to the SD card's secure data area and creates a file system for user data for storage of user data corresponding to the SD card's user data area. The system accesses the data stored in the secure area of the provisioned virtual SD card. In addition, the system uses the virtual secure digital (SD) card.

Computing Machine Architecture

Figure 1:
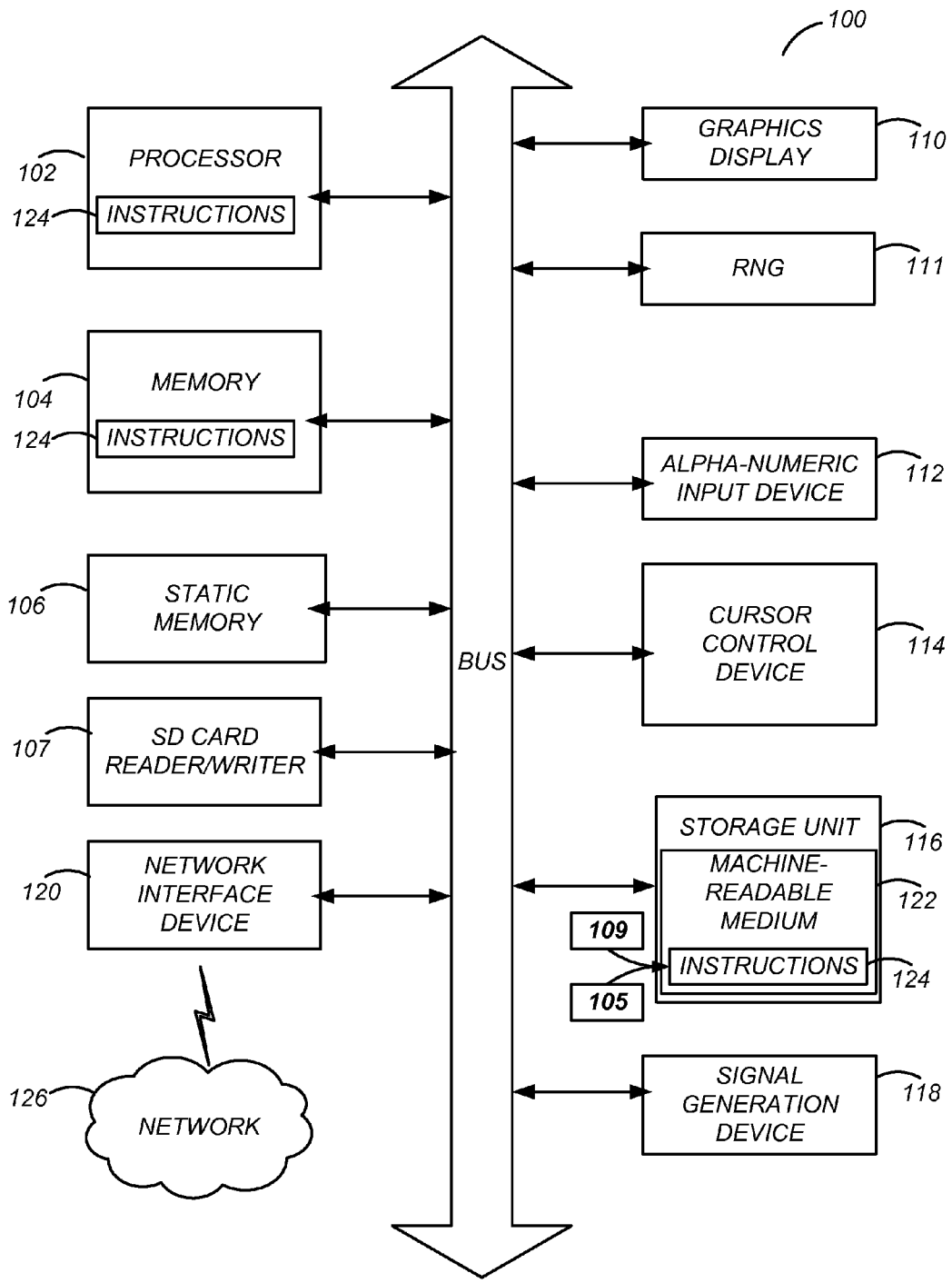
FIG. 1 illustrates one example embodiment of components of an example machine able to read instructions from a machine-readable medium and execute them in a processor (or controller).

FIG. 1 is a block diagram illustrating components of an example machine able to read instructions from a machine-readable medium and execute them in a processor (or microcontroller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a network router, switch or bridge, a gaming console, a Blu-ray Disc player, or any machine capable of executing instructions 124 (sequential or otherwise) that specify actions to be taken by that machine. In addition, the machine may be configured to include instructions stored as firmware. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a persistent storage unit 116, a signal generation device 118 (e.g., a speaker), and a network interface device 120, which also are configured to communicate via the bus 108. The computer system 100 also may include a random number generator (RNG) 111. The random number generator 111 can be implemented in either hardware or software.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

Also included in the computing system 100 is a secure digital (SD) card reader/writer 107. The SD card reader/writer in one embodiment may be a physical device that accepts SD card in various physical formats (SD card, mini SD, or micro SD) and interfaces the electrical characteristics such that the storage on the SD card can be accessed by the computing device. The card reader may be internal to the computing device or external using adapters such as a USB-SD card reader, PC card-card reader, express card reader, or any other electrical interface such that the computing device can communicate with an SD card.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

In one example embodiment, the instructions 124 correspond to an application program 105. The application program 105 include a set of machine readable instructions to carry out key exchange and data transfer specifications as further described herein. In one example, the application program 105 may work with a digital rights management (DRM) key and tamper resistant software.

In addition, the example computer system 100 may include a SD secure application programming interface (API) 109. The SD Secure API is a software component that facilitates access to the SD card's secure area.

Typical SD Card Architecture and Functions

The SD card 200, may be a full size, mini SD, or micro SD physical format. The SD card 200 must conform to the specifications developed and enforced by the SD ASSOCIATION. The SD card 200 is illustrated to provide a general idea of how an SD card may be internally constructed so that the functionality assigned to the virtual SD card can be better understood. The decomposition is not intended to reveal any specific trade secrets or patents of the many SD card vendors.

Figure 2:
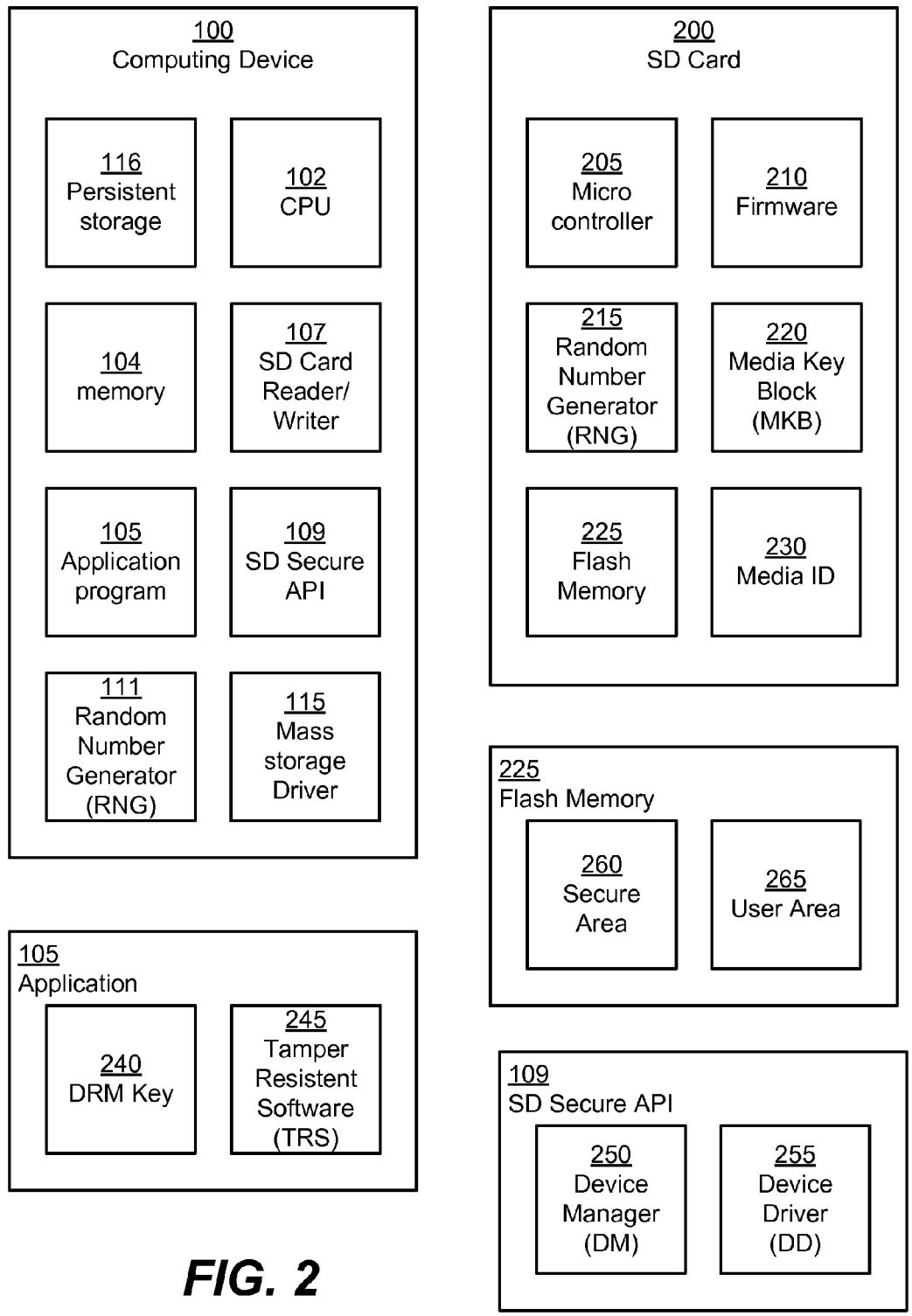
FIG. 2 illustrates one example embodiment of a computing configuration for use with a digital right management (DRM) environment.

FIG. 2 illustrates one example embodiment of a computing configuration for use with either a digital right management (DRM) environment or insecure environment. Understanding of both applications is required to understand the virtual SD card's architecture, provisioning, and operation. The SD card 200 includes a microcontroller 205, firmware 210, a random number generator (RNG) 215, a media key block (MKB) 220, flash memory 225, and a media identifier (MID) 230. Data is stored within the flash memory 225, which is partitioned into two areas: Secure Area 260 and User Area 265. Both secure data and unsecure (user) data are stored in a persistent manner so that it can be retrieve at a later time. The secured area 260 may be implemented as a physical or logical device within the SD card as chosen by the SD card's original equipment manufacturer (OEM). The secure area's 260 size is determined at design time according to the SD card specifications. It is noted that every SD card is provisioned with a secure area 260, even though it may never be used by any application. The user (or unsecured) area 265 may be implemented in the same manner as the secure area 260. The user (or unsecured) area 265 also may be either physical or logical partitions depending on implementation within the SD card.

The computer system 100 sends request for User Data 265 through a card reader 107. The mass storage driver 115 provides the software interface for the computer system 100 to the card reader 107 for User Data 265. In turn the card reader sends requests to the SD card through the microcontroller 205 and firmware 210. The firmware 210 comprises software machine instructions by the microcontroller 205 to interpret card reader commands and return data to the card reader. Data access is not restricted and authentication is not required to read or write the data within the User Area.

Access to the secure area is restricted and can be used for DRM applications. The application program 105 and the SD secure API 109 of the computer system 100 are further broken out for illustration purposes. Specifically, the application program 105 includes a DRM key 240 and tamper resistant software (TRS) 245.

Next, referring to the SD secure API 109, it comprises a software component that facilitates access to the secure area 260 on the SD card 200. The software architecture of the computer system 100 assumes that the SD card is capable of responding to the commands from the application program 105 using the SD secure API 109 architecture for the purpose of secure area access. The SD secure API 109 includes the device manager (DM) 250 and the device driver (DD) 255. The device manager (DM) 250 identifies SD card readers attached to the computer system 100. Once card readers are identified, the device manager 250 matches the corresponding device driver 255 with the specific physical card reader, or readers, attached to the computer system 100. The device driver 255 provides a device independent interface to card readers. It formats secure commands specifically for card readers and returns data to the application program 105. The device driver 255 provides a conduit for communicating with card readers, which in turn communicate directly with the secure area 260 of the SD card 200.

Turning now to the application program 105, the DRM key 240 stored in the computer system 100 and used to complete an authenticated key exchange with the SD card 200. Specifically, the authenticated key exchange is used to gain access the SD card secure area 260 in accordance with the Authenticated Key Exchange (AKE) used by Content Protection for Recordable Media (CPRM) specifications for use with SD cards. The application is provisioned with the DRM key either at initial installation or contained within the program itself. The random number generator 111 in the computer system 100 provides random numbers for replay protection required by the AKE specification. The firmware 210 includes the necessary algorithms (cryptograph and hash) in accordance with specifications.

The key exchange process and resultant data transfer process are subject to hackers (unauthorized or rogue applications) attempting to obtain the data stored on the secure area 260 of the SD card 200 that is transferred into the application program 105. The tamper resistant software 245 protects against the attacks. The tamper resistant software 245 comprises software code that may include techniques which remain proprietary to their respective vendors but may include such items as code obfuscation, anti-debugging, code duplication and/or other anti-tamper techniques.

The random number generator 215 can be implemented in either hardware or software. It is noted that the random number generator 111 in the computer system 100 and the random number generator 215 in the SD card 200 are both used during AKE. The media key block (MKB) 220 is structured in accordance with the CPRM specification for SD Cards.

Virtual SD Card Architecture

The virtual SD card 300 implements in software the functionality previously implemented by SD card 200 in hardware. The functional components of the computer system 100 are used by the virtual SD card 300 implementation. The virtual SD card 300 provides not only the interface to device manager 250, but also the processing that would normally take place in the microcontroller 205 on the SD card 220 while executing the firmware 210 of the SD card 230. In addition, rather than send data protocol commands to the SD card 220, the virtual device driver 305 interfaces directly with the virtual secured area file system 315 and the virtual user area file system 325.

Figure 3:
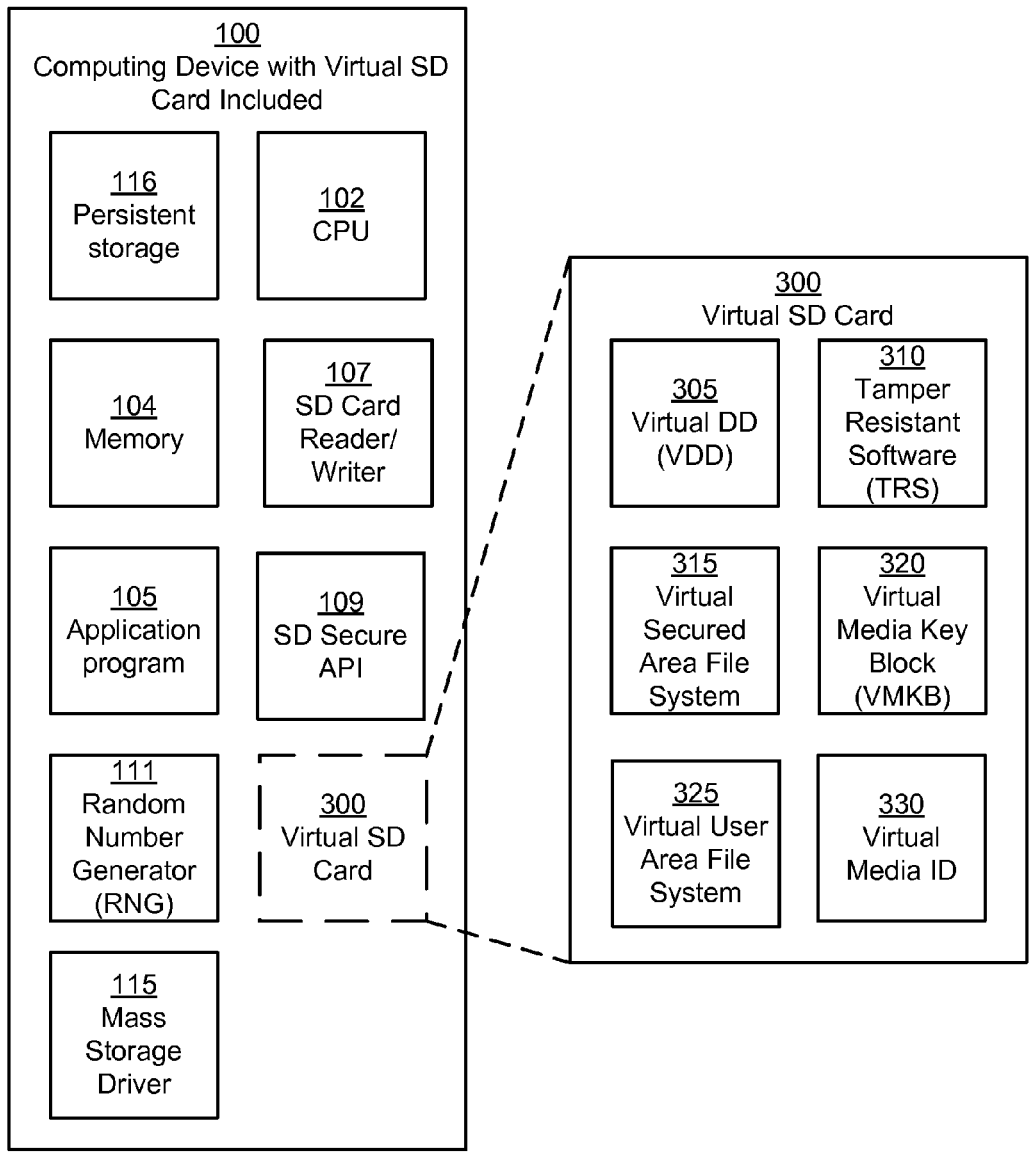
FIG. 3 illustrates one example embodiment of a computing device with virtual Secure Digital (SD) card.

FIG. 3 illustrates one example embodiment of the computing device 100 including a virtual Secure Digital (SD) card 300. In this example, virtual SD card 300 can be configured within internal storage 116 or may be configured within an external storage that is coupled with the computer system 100. By way of example, the external storage can be a hard disk drive or a RAID storage that is coupled to the computer system 100 via a wired connection, e.g., IEEE 1394 or USB. Another example of the external storage can be storage accessible by the computer system 100 through a storage area network that is wired or wirelessly coupled. Yet another example of the external storage is a storage location accessible by the computer system 100 in a network cloud, e.g., accessible through an internet connection. For ease of discussion, the virtual SD card 300 is described in the context of a configuration within the internal storage 116, but it would be understood that the configuration is applicable to external storage coupled with the computer system 100.

In FIG. 3, the virtual SD card 300 includes a virtual device driver (DD) 305, tamper resistant software 310, a virtual secure area filed system 315, a virtual media key block 320, virtual user area file system 325, a virtual media identification (ID) 330. The virtual device driver 305 is configured to interface the device manager 250, using the same interface as the device driver 255 providing similar functions as well. The device manager 250 and device driver 255 interfaces remain unchanged from the specification for SD cards. The virtual DD 305 is secured using the tamper resistant software 310. In another embodiment, the DM is not required since only one card reader may be used in the system. For example, the application may use the DD as the direct interface to the SD card.

The virtual secured area file system 315 and the virtual user area file system 325 can be implemented as file systems within an encrypted file. This provides the same level of protection as a physical SD card 220 implementation. They can also be implemented as physical or logical partitions on the same or separate devices, with or without encryption depending on the overall system security requirements. However, unlike physical SD cards, the virtual SD card 300 allows for storage of larger volumes of DRM media typically stored on physical SD cards. Moreover, this configuration allows for additional media management such as layering media management system to organize and interface with one or more stored virtual SD cards using a user interface accessible through the computer system 100.

The secured area file system 315 is configured as a storage area for secure data. This may be implemented as a physical or logical storage area within external storage 300. Because the file system can be accessed by the computer system 100 without using the virtual SD card 300, the data within the secure area is protected using an encryption key. The encryption key is derived from the computing device's unique information (e.g., processor serial number, bios serial number, device serial number), and hidden information effectively binding the file systems to the computer system 100. This prevents data access if storage is transferred to another computer system. In one example embodiment, the encryption key is not stored but rather derived. In another embodiment, the encryption key may be stored in a trusted host further enhancing security protection against data access if storage is transferred. Authentication is also provided using AKE methods. It is preferable that the secured area file system 315 is stored within a non-removable storage device to further assist in replay-attack prevention. These methods bind the file systems to a specific computer that cannot be transferred to another computer. If an attempt is made to transfer the bound file systems, the derived encryption key is different and the data access is denied by AKE authentication and data cannot be decrypted. The virtual media key block (MKB) 320 is equivalent to media key block 220. The virtual media key block 320 is read by the computer system 100 utilizing the media key block 220 from the SD card 220. The media key block 220 is stored using the process described previously, e.g., with respect to the virtual secured area file system 315.

The user area file system file system 325 is a storage area for unsecured data. The virtual user area file system 325 is maintained on the storage device 116 in a physical or logical partition. Unlike the secure area, encryption and non-removable storage are not required. The virtual media ID 330 is functionally similar to the media ID 230. The virtual media ID 330 is stored using the process described previously, e.g., with respect to the virtual secured area file system 315.

By leveraging storage 116 of the computer system 100 to create the virtual SD card, the file storage layouts and data implementations can replicate a physical SD card implementation. This simplifies the software implementation to a unified storage algorithm for data on SD cards and on virtual SD archives. It is noted that in the virtual SD card 300 configuration, the card reader interface 107 is no longer necessary because there is no communication with a physical SD card. Rather, the virtual device driver 305 is configured to include the firmware 210 of the original SD card.

Virtual SD Card Provisioning and Initialization

Figure 4:
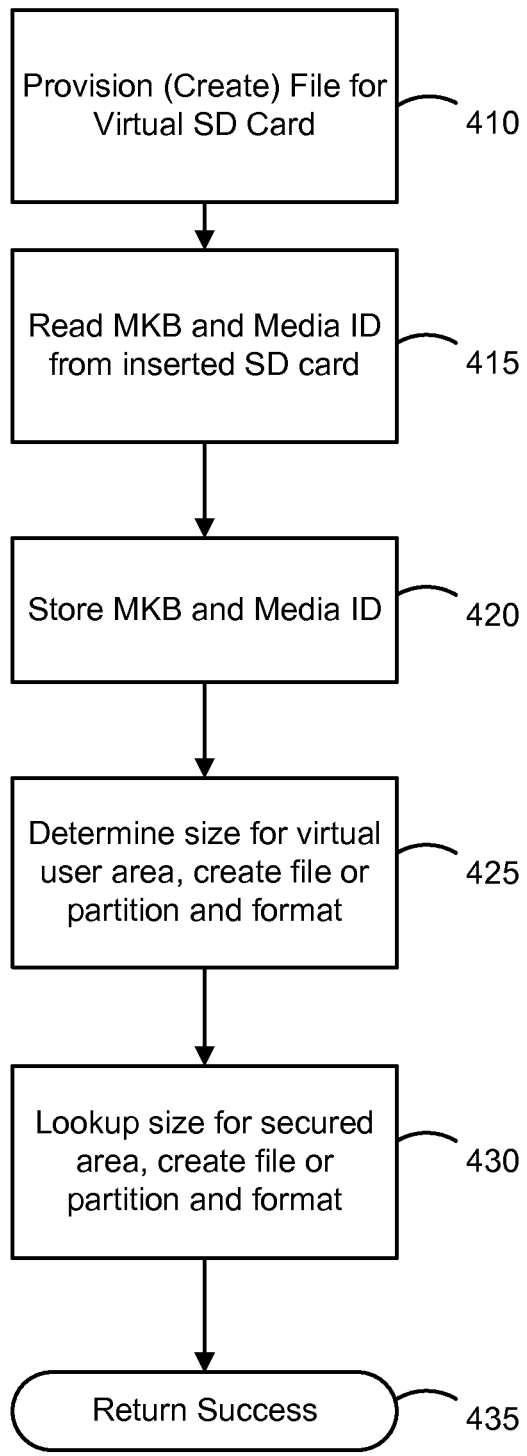
FIG. 4 illustrates one example embodiment of a process for provisioning a virtual SD card.

Turning now to FIG. 4, it illustrates one example embodiment of a process for provisioning a virtual SD card 300. The provisioning process for creating the virtual SD card 300 following by defining/assembling the components for the virtual SD card 300. The process detects the SD card 200 in the SD card reader/writer 107 of the computer system 100. The SD card reader/writer 107 reads the media key block 220 and media ID 230 from the SD card 200 and stores 420 them in the storage unit 116 as the Virtual Media Key Block 320 and the Virtual Media ID 330 for access by the virtual SD card 300. The virtual media ID 330 is provisioned prior to first use, such as device manufacture, software load time, or when a first SD card is read by the computer system 100 utilizing the media ID 220 from the SD card 200.

The process determines 425 the physical or logical devices to use, size for a virtual user area 325 on the virtual SD card 300 and creates a file or partition on the storage 116 that is accordingly formatted for the virtual user area 325. A size of the secured area file system 315 is determined at provisioning time according to the SD card specifications. The size of the virtual secured area file system 315 is a table lookup from SD ASSOCIATION specifications based on the size of the virtual user area file system 325. The process creates a file or partition on the storage 116 that is accordingly formatted for the virtual secured area 315. Once completed the process is returned as successful 435. With the virtual SD card 300 provisioned, it is now ready for use.

Using a Virtual SD Card

Figure 5:
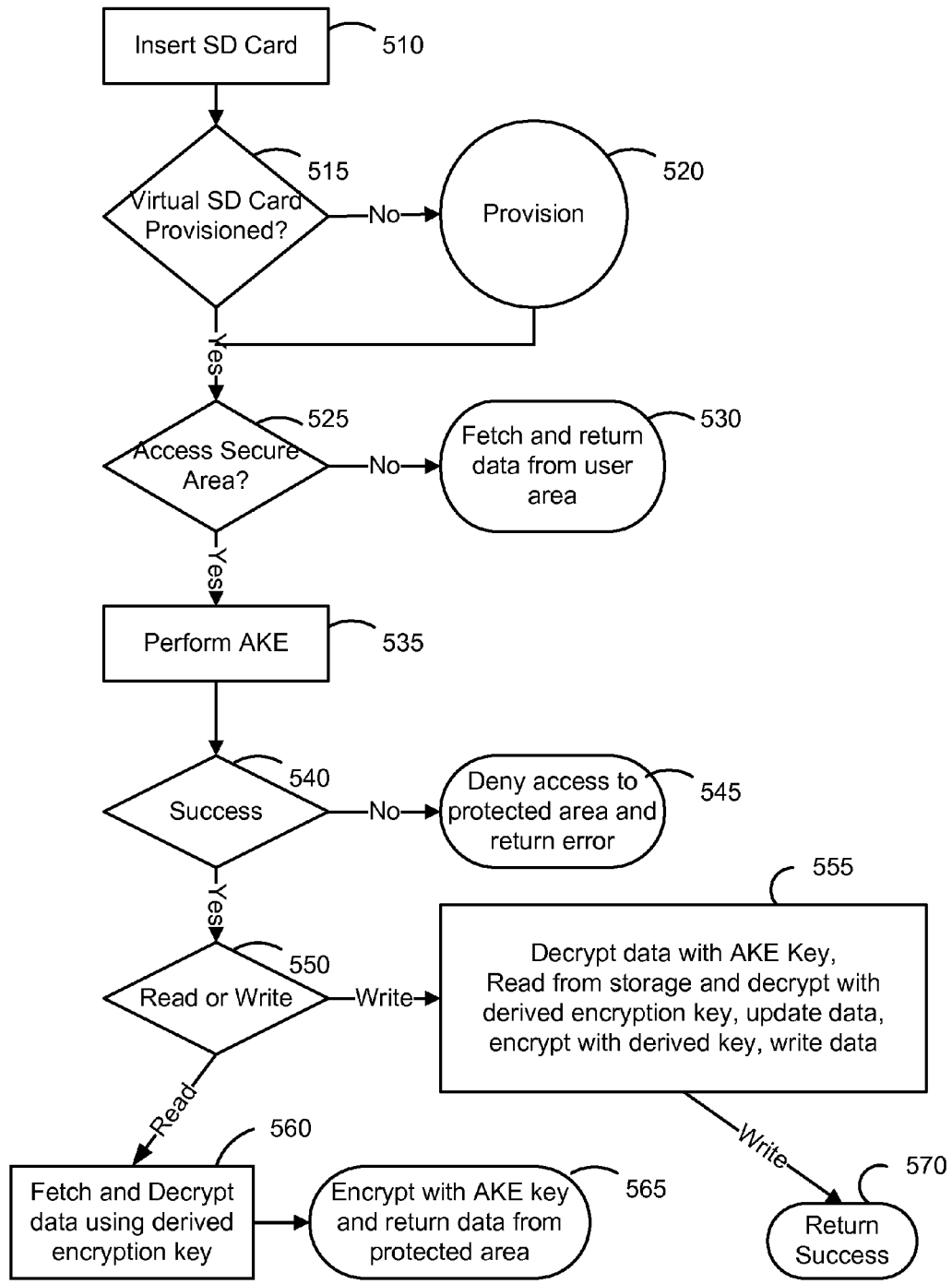
FIG. 5 illustrates one example embodiment of a process for using a virtual SD card.

FIG. 5 illustrates one example embodiment of a process for using the virtual SD card 300. In this example, the process detects insertion of a SD card 200 in the SD card reader/writer 107 of the computer system 100. The process determines 515 if the virtual SD card 300 is provisioned. If it is not provisioned, the process provisions 520 the SD card, for example, as described in FIG. 4.

The process determines 525 if the request is for the secure area 315 of the virtual SD card. If the request is not for the secure area, the process only fetches and returns 530 data from the user area 325.

If the request is for the secured area, the process performs 535 AKE. If the process determines 540 AKE is not successful, the process denies 545 access to the secure area and may return an error on a display of the computer system 100. If the key exchange is successful, the process determines 550 whether a read or a write operation will be performed. If a write operation, the process decrypts 555 data with the key derived during AKE, reads from storage, decrypts the with encryption key, updates data, encrypts with the encryption key, and writes data to the virtual secure area file system 315 of the virtual SD card 300. It is noted that there are two encryption keys. One encryption key is for physical storage. The second key is the key calculated during AKE. This key protects data during transport between the virtual SD card and the application program. If successful, an indication 570 of success is returned. If a read operation, the process fetches and decrypts 560 data from the virtual secure area file system 315 using the key derived from the computing device unique information. The process encrypts 565 the data with the AKE key for transport to the application program 105. The process returns (or retrieves or extracts) data from the virtual secure area 315 to the application program 105.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example processes described herein, e.g., as described with FIGS. 3, 4 and 5, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for provisioning and using a virtual Secure Digital card through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating a virtual secure digital (SD) card, the method comprising:
   reading a media key block and media identification for an SD card;
   storing the media key block and the media identification;
   creating a file system for secure data on a storage device for storage of secure data corresponding to a secure data area of the SD card; and
   creating a file system for user data on the storage device for storage of user data corresponding to a user data area of the SD card, wherein a size of the file system for secure data is determinant on a size of the file system for user data, the determination based on a lookup table providing a relationship between the sizes.

2. The method of claim 1, wherein the file system for secure data is encrypted.

3. The method of claim 2, wherein the file system is encrypted with an encryption key, the encryption key derived from computer system information and the encryption key not stored by the computer system.

4. The method of claim 2, wherein the file system is encrypted with an encryption key, the encryption key derived from a computer system and stored by the computer system.

5. The method of claim 2, wherein the file system is encrypted with an encryption key, the encryption key derived from a computer system and stored by the computer system within a trusted host.

6. The method of claim 2, wherein the file system for secure data and the file system for user data are located on different physical partitions of the storage device.

7. The method of claim 2, wherein the file system for secure data and the file system for user data are located on different logical partitions of the storage devices.

8. The method of claim 2, wherein the file system for secure data and the file system for user data are within an existing file system.

9. The method of claim 2, wherein the media key block and the media identification are assigned to the device and not from the SD card.

10. The method of claim 1, wherein the file system is encrypted with an encryption key, the encryption key derived from computer system information and the encryption key not stored by the computer system.

11. The method of claim 1, wherein the file system is encrypted with an encryption key, the encryption key derived from a computer system and stored by the computer system.

12. The method of claim 1, wherein the file system is encrypted with an encryption key, the encryption key derived from a computer system and stored by the computer system within a trusted host.

13. The method of any one of claims 1 through 5, wherein the media identification comprises random data not allocated from the SD card.

14. A method using a virtual secure digital (SD) card, the method comprising:
  determining if the virtual SD card is provisioned;
  provisioning the virtual SD card in response to the virtual SD card not being provisioned, the provisioning including:
    creating a file system for secure data on a storage device for storage of secure data corresponding to a secure data area of the SD card; and
    creating a file system for user data on the storage device for storage of user data corresponding to a user data area of the SD card, wherein a size of the file system for secure data is determinant on a size of the file system for user data, the determination based on a lookup table providing a relationship between the sizes;
  accessing the data stored in the secure area of the provisioned virtual SD card; and
  extracting the data from the secured area of the provisioned virtual SD card.

15. The method of claim 14, further comprising performing an authentication using Authenticated Key Encryption (AKE) before accessing the data in the secure area of the provisioned virtual SD card.

16. The method of claim 14 or 15, wherein data received from an application program through Authenticated Key Encryption (AKE) is first decrypted.

17. The method of claim 14, wherein data received from an application program through Authenticated Key Encryption (AKE) is encrypted with another key before storing the data in the secure area of the provisioned virtual SD card.

18. A non-transitory computer readable medium configured to store instructions that, when executed, cause at least one processor to:
  read a media key block and media identification for an SD card;
  store the media key block and the media identification;
  create a file system for secure data on a storage device for storage of secure data corresponding to a secure data area of the SD card; and
  create a file system for user data on the storage device for storage of user data corresponding to a user data area of the SD card, wherein a size of the file system for secure data is determinant on a size of the file system for user data, the determination based on a lookup table providing a relationship between the sizes.

19. The computer readable medium of claim 18, wherein the file system for secure data is encrypted.

20. The computer readable medium of claim 19, wherein an encryption key is derived from a computer system information, the encryption key not stored by the computer system.

21. The computer readable medium of any one of claims 18, 19, or 20, wherein the encryption key is derived from a computer system and stored by the computer system.

22. A non-transitory computer readable medium configured to store instructions that, when executed, cause at least one processor to:
  determine if a virtual SD card is provisioned;
  provision the virtual SD card in response to the virtual SD card not being provisioned, wherein to provision the virtual SD card includes to:
    create a file system for secure data on a storage device for storage of secure data corresponding to a secure data area of the SD card; and
    create a file system for user data on the storage device for storage of user data corresponding to a user data area of the SD card, wherein a size of the file system for secure data is determinant on a size of the file system for user data, the determination based on a lookup table providing a relationship between the sizes;
  access the data stored in the secure area of the provisioned virtual SD card; and
  extract the data from the secured area of the provisioned virtual SD card.

23. The computer readable medium of claim 22, further comprising: performing an authentication using Authenticated Key Encryption (AKE) before accessing the data in the secure area of the provisioned virtual SD card.

24. The computer readable medium of claim 23, wherein data received from an application program through Authenticated Key Encryption (AKE) is first decrypted.

25. The computer readable medium of claim 23, wherein data received from an application program through Authenticated Key Encryption (AKE) is encrypted with another key before storing the data in the secure area of the provisioned virtual SD card.

* * * * *